Sept. 27, 1955　　　　I. T. SWAIN　　　　2,718,780
AUTOMATIC PRESSURE CONTROL AND LEAKAGE DETECTOR
Filed July 11, 1951　　　　　　　　　　　　2 Sheets-Sheet 1

INVENTOR
*Irving T. Swain*

BY *C. B. Hamilton*
ATTORNEY

Sept. 27, 1955     I. T. SWAIN     2,718,780
AUTOMATIC PRESSURE CONTROL AND LEAKAGE DETECTOR
Filed July 11, 1951     2 Sheets-Sheet 2
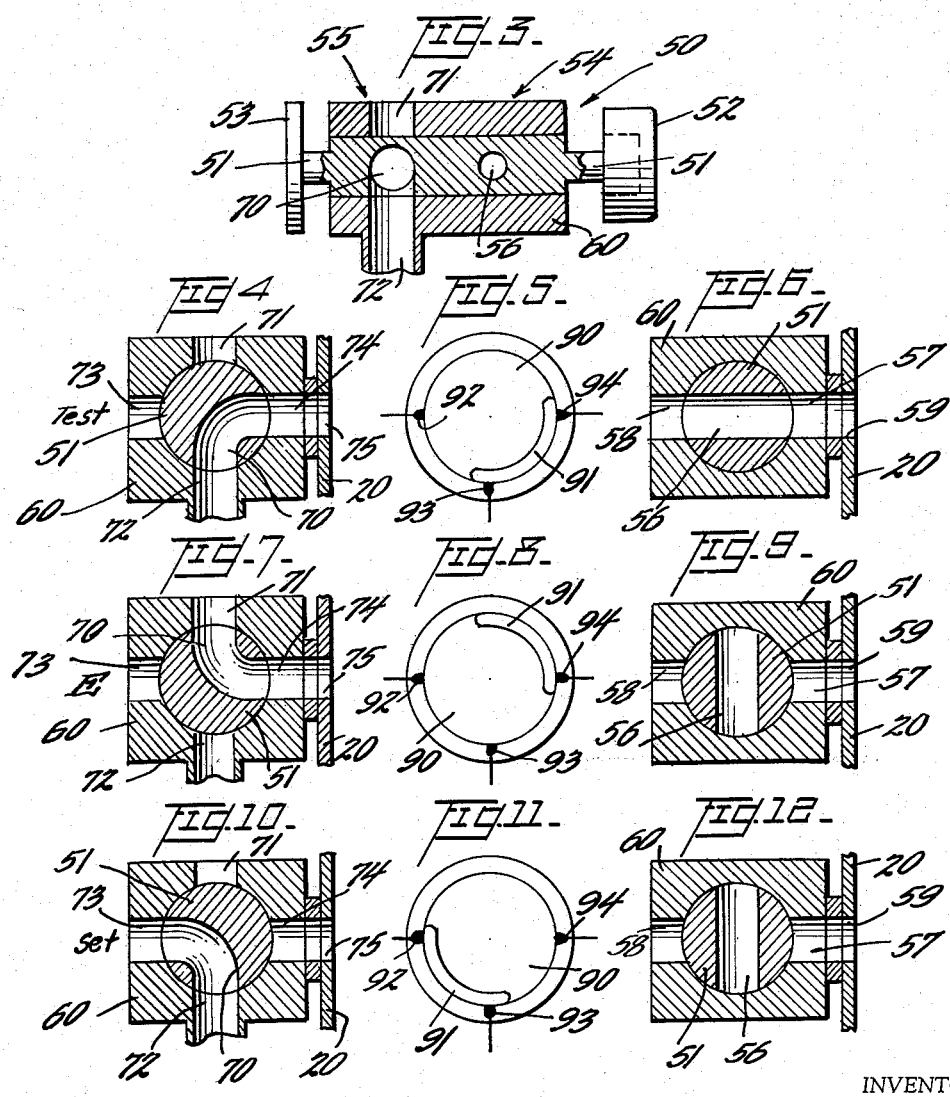
INVENTOR
Irving T. Swain,
BY C. B. Hamilton.
ATTORNEY United States Patent Office 2,718,780
Patented Sept. 27, 1955

2,718,780

AUTOMATIC PRESSURE CONTROL AND LEAKAGE DETECTOR

Irving T. Swain, Winston-Salem, N. C., assignor to Western Electric Company, Incorporated, New York, N. Y., a corporation of New York Application July 11, 1951, Serial No. 236,178

9 Claims. (Cl. 73—49.2)

This invention relates to an apparatus and means for testing closed vessels for leaks or tightness to fluids under pressure, and more particularly to a unitary device having a fluid pressure source and pressure sensitive indicator, which device is placed entirely within a closed vessel to determine the tightness thereof against fluid pressure leaks.

Formerly, the only methods of pressure testing closed vessels for tightness or leaks required a valve connection into the vessel under test which was used to admit air under pressure into the interior of the vessel so that the presence or absence of leaks could be determined by various visual tests or by observing a decrease in the pressure of the source of air under pressure once the vessel under test had been completely filled. The visual test in which the closed vessel under test is submerged in a fluid medium so that the operator can see bubbles indicating a leak is manifestly unsatisfactory for use with large vessels because of the size and amount of equipment necessary, and because of the human error involved in personal visual observation of the rather minute bubbles produced by small leaks. The use of a method involving observation of the variations in pressure of the source of compressed air applied to the vessel under test is undersirable because of the leaks inherent in the interconnection of the vessel under test with the source of fluid under pressure.

Accordingly, an object of this invention is to provide a unitary leak detecting apparatus including a source of fluid under pressure which may be placed within the vessel to be tested to determine the presence of leaks in the vessel after closure thereof. Another object of the invention is to provide a method for pressure testing closed vessels for leaks which consists in placing the pressure applying and detecting apparatus entirely within such a closed vessel under test to avoid errors in testing due to faulty interconnection between the vessel under test and the outside source of fluid under pressure.

In accordance with these and other objects, one embodiment of the invention consists of an apparatus having two chambers which are interconnected by an extensible pressure-sensitive diaphragm movable in response to a pressure differential between the two chambers to actuate both a signalling circuit and an electrically operated valve. One of the chambers is filled with air under a standard pressure and the other chamber is in communication with the ambient pressure of the air in the interior of the vessel under test. A source of air under high pressure is controlled by the electrically operated valve so that the valve and source conjointly maintain the air pressure within the vessel at a predetermined level after the vessel is tightly closed. The signalling circuit controlled by the movable diaphragm indicates a decrease in pressure within the vessel as a determination of the presence of leaks therein.

Many other objects and advantages of the means and apparatus will be apparent from a consideration of the following specification in conjunction with the drawings wherein:

Fig. 3 is a cross-sectional view taken along line 3—3 in Fig. 1 showing a unitary control device including two air valves and an electrical switch;

Figs. 4, 5 and 6 are cross-sectional views of the combined two air valves and electrical switch in a testing position;

Figs. 7, 8 and 9 are cross-sectional views of the combined air valves and switch in a position for exhausting air from the apparatus; and Figs. 10, 11 and 12 are cross-sectional views of the combined air valves and electrical switch in a position for calibrating the apparatus.

Figure 1:
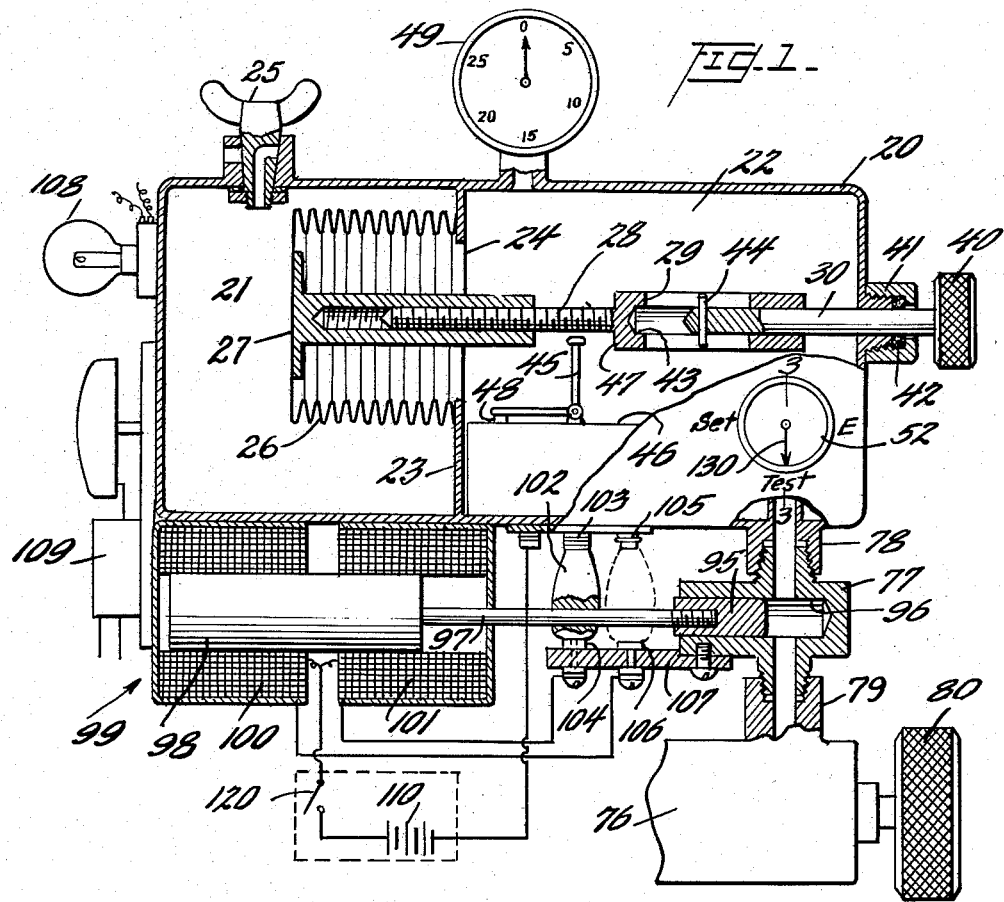
Fig. 1 is a cross-sectional view of an apparatus embodying the invention.

Referring now to the drawings, wherein like reference numbers designate the same elements throughout the several views, and more particularly to Fig. 1, a pressure tight receptacle 20 is divided into two chambers 21 and 22 by a wall 23 having an annular opening 24 therein. A petcock 25 is secured in an upper wall of chamber 21 for equalizing the air pressure within chamber 21 and the ambient pressure of the external atmosphere surrounding the receptacle 20.

A cylindrical extensible diaphragm 26 which covers the opening 24 in wall 23 moves either to the right or to the left in Fig. 1 in response to a pressure differential between the chambers 21 and 22 and a round plate 27 having an internally threaded boss is secured at one end to the diaphragm 26 and the boss of plate 27 is engaged by a threaded member 28 having a slot 29 formed in one end thereof. A rod 30 having a knurled knob 40 at one end thereof extends into chamber 22 through a pressure tight seal comprising a cover cap 41 and a washer 42 to engage a cylindrical opening 43 in the threaded member 28. A dowel 44 secured to one end of rod 30 engages the slot 29 so that rotary motion imparted to rod 30 is transmitted to threaded member 28; however, the rod 30 and member 28 are free to move relative to each other in translatory movement with the dowel 44 moving longitudinally in the slot 29 to provide a means for guiding the relative movement of the member and the rod. A switch arm 45 is pivotally mounted to a microswitch 46 which is secured to the bottom wall of chamber 22. The upstanding portion of the switch arm 45 is in alignment with a shouldered portion 47 of the member 28 so that movement of the member 28 to the left of Fig. 1 will rock the switch arm 45 about its pivot to move a switch actuating lever 48 of the microswitch 46. A pressure gauge 49 is secured to an upper wall of the receptacle 20 and is in fluid communication with the chamber 22 so as to indicate the fluid pressure therein.

An electric and pneumatic control device, indicated generally as 50 in Fig. 3, is secured within the chamber 22 with a control shaft 51 thereof extending through a valve block 60 and through a wall of the receptacle 20 to engage a control knob 52 (Figs. 1 and 3). The control device 50 also includes an electrical selector switch 53 secured to one end of the control shaft 51 and two pneumatic valve sections 54 and 55. Valve section 54 (Figs. 3, 6, 9 and 12) has a cylindrical bore 56 in the control shaft 51 and a pair of orifices 57 and 58. The orifice 58 is in fluid communication with the interior of chamber 22, and the orifice 57 is in fluid communication with the fluid medium surrounding the receptacle 20 through an opening 59 in the wall of receptacle 20. The valve section 55 is provided with a right angle bore 70 in the control shaft 51 and a plurality of orifices 71, 72, 73 and 74. The orifices 71 and 73 are in fluid communication with the interior of chamber 22, and orifice 74 is connected to the fluid medium surrounding the receptacle 20 by an opening 75 in the wall of the receptacle 20. Orifice 72 is interconnected with a compressed air tank 76 (Fig. 1) by means of a T-valve 77 which is connected to a projecting portion 78 on receptacle 20 and a similar projecting portion 79 on compressed air tank 76. A knob 80 connected to a valve on the tank 76 controls the emission of air.

Figure 2:
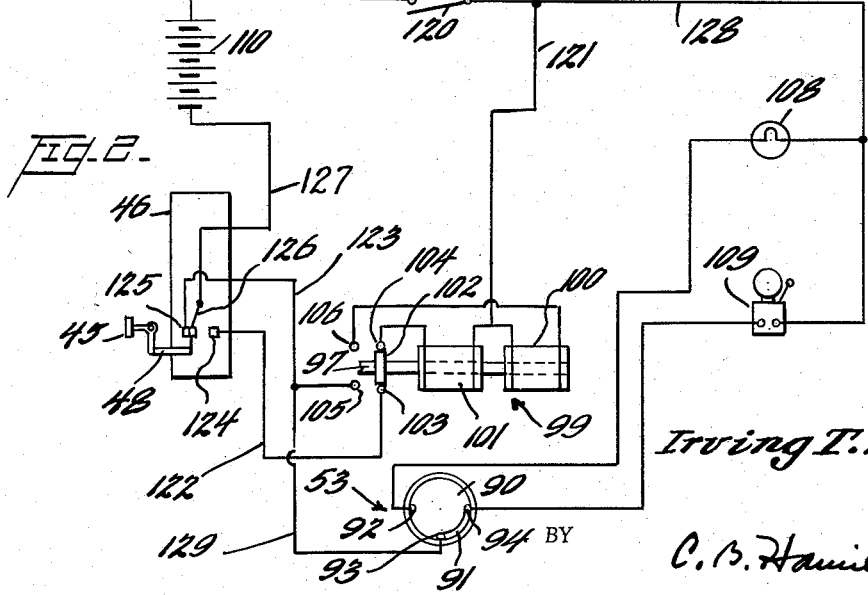
Fig. 2 is a schematic of a control circuit including a signalling means for the apparatus shown in Fig. 1.

The selector switch 53 (Figs. 3, 5, 8 and 11) includes a rotatable center section 90 having a conducting portion 91 on the outer periphery thereof which serves to selectively interconnect a plurality of contacts 92, 93 and 94 (Fig. 2). Since the bores 56 and 70 and the rotatable center section 90 of the electric selector switch 53 are simultaneously moved by manual rotation of the control knob 52, it is possible to quickly set the control device 50 for any of three desired conditions.

A valve gate 95 (Fig. 1) which is slidable within a cylindrical bore 96 of the T-valve 77 is secured to an operating rod 97, the other end of which is secured to an armature 98 of a solenoid 99 having two windings 100 and 101. In Fig. 1, the armature 98 is shown in a position produced by the energization of winding 100. The energization of winding 101 moves armature 98 to the right so that the valve gate 95 is interposed between the orifice 72 (Fig. 3) and the compressed air tank 76. A bridging conductor 102 is secured to the operating rod 97 so as to interconnect either of two pairs of contacts 103, 104 or 105, 106. The pair of contacts 104, 106 are secured to a dielectric plate 107 which is supported by the T-valve 77.

An electric lamp 108 and a bell 109 are secured to an end wall of the receptacle 20 to provide both visible and audible signalling means.

Referring now to Fig. 2 of the drawings wherein is shown an electric control circuit for the leak detecting apparatus, a battery 110 is selectively connected to either of the windings 100 or 101 of the solenoid 99 by a circuit including switch 120, conductor 121, either winding 100 or 101, contacts 103, 104 or 105, 106, conductor 122 or 123, contact 124 or 125, switch arm 126 and thence through conductor 127 to the battery 110. When microswitch 46 is in its normal position shown in Fig. 2, either the lamp 108 or the bell 109 may be energized through a circuit comprising battery 110, switch 120, conductor 128, contacts 92 or 94 and 93, conductors 129 and 123, contact 125, switch arm 126, and thence through conductor 127 back to battery 110. The determination of whether the light 108 or the bell 109 is to be energized is determined by the positions of selector switch 53 and conducting portion 91.

In operation, petcock 25 is opened to equalize the air pressure within the chamber 21 and that of the fluid medium surrounding receptacle 20. The control knob 52 is then rotated so that an indicator line 130 on this knob is aligned with "E" on the receptacle 20 (Fig. 1). In this position, the electrical selector switch 53 and the valve sections 54 and 55 have been moved to the positions shown in Figs. 7, 8 and 9. In valve section 55, the bore 70 interconnects the interior of chamber 22 with the fluid medium surrounding the receptacle 20 so that the pressure within the chamber 22 is equal to the ambient pressure of the fluid medium surrounding receptacle 20 and, consequently, equal to the pressure within chamber 21. Since the bore 56 of the valve section 54 is in a vertical position, there is no interconnection between the orifices 57 and 58. Also, in this position the conducting portion 91 of the rotatable section of selector switch 53 does not interconnect any of the plurality of contacts 92, 93, and 94. The petcock 25 is then closed by the operator to seal off chamber 21 from the ambient pressure of the surrounding fluid medium.

The operator next rotates control knob 52 so that the indicator line 130 thereon is in alignment with the letters "SET" (Fig. 1). In this position the valve sections 54 and 55 and the electric selector switch 53 are moved into the relationship shown in Figs. 10, 11 and 12. In this position, the bore 70 interconnects orifices 72 and 73, and the conducting portion 91 interconnects contacts 92 and 93. Next, the operator closes the switch 120 (Fig. 2) so that electric lamp 108 is energized through a circuit comprising battery 110, switch 120, conductor 128, lamp 108, contact 92, conducting portion 91, contact 93, conductors 129, 123, contact 125, switch arm 126 and thence through conductor 127 back to battery 110 to light the lamp. Also, the closure of switch 120 energizes winding 100 of solenoid 99 through a circuit extending from battery 110 through switch 120, conductor 121, contacts 105, 106, conductor 123, contact 125, switch arm 126 and conductor 127. Energization of winding 100 moves the armature 98 into the position shown in Fig. 1 to move valve gate 95 so that compressed air tank 76 is placed in fluid communication with orifice 72 and, accordingly, in communication with the interior of chamber 22. This movement of armature 98 also moves conductor 102 from between contacts 105, 106 to break the circuit energizing winding 100.

The operator then manually rotates knob 40 in a counterclockwise direction until further movement is no longer possible. At this time the slotted end of member 28 is moved into engagement with the side wall of receptacle 20. Knob 80 is now rotated to open the compressed air valve on the compressed air tank 76 so that air under pressure flows from this tank into chamber 22. The operator allows this compressed air to flow into chamber 22 until the air pressure gauge 49 indicates a predetermined air pressure within chamber 22. At this time knob 80 is rotated to shut off the flow of air from tank 76.

The knob 40 is then manually rotated in a clockwise direction until such time as the shouldered portion 47 of bolt 28 engages switch arm 45 to rotate the arm about its pivot, thus depressing lever 48 to move switch arm 126 (Fig. 2). This movement of switch arm 126 breaks the circuit energizing the lamp 108 through contact 125, and also closes a circuit through contact 124 to energize winding 101 of solenoid 99 through conductor 122, contacts 103, 104, conductor 121 and through switch 120 to battery 110. Energization of winding 101 moves the armature 98 to the right in Fig. 1 so that valve gate 95 is interposed between compressed air tank 76 and orifice 72 (Fig. 3). This movement of armature 98 breaks the circuit energizing winding 101 by moving contact 102 to interconnect contacts 105 and 106.

At this time, the apparatus is adjusted so that a decrease in the pressure of the air within chamber 22 below the predetermined pressure observed by the operator on pressure gauge 49 will move the diaphragm 26 to the right as viewed in Fig. 1 with the consequence that arm 45 will be pivoted to return microswitch 46 to its normal unactuated position. Switch 120 is then opened.

To test a closed vessel, the operator turns control knob 52 until the indicator line 130 is in alignment with the position marked "TEST" as shown in Fig. 1 and at which time the valve sections 54 and 55 and the electrical selector switch 53 are positioned as shown in Figs. 4, 5 and 6. Knob 80 is manually rotated to open the valve in air tank 76 and the unitary apparatus is placed within a vessel to be tested. The switch 120 is then closed. Since valve section 54 in the position shown in Fig. 6 interconnects chamber 22 with the interior of the vessel under test, the air pressure in chamber 22 is decreased below the predetermined pressure necessary to maintain diaphragm 26 in its previously adjusted position.

Accordingly, diaphragm 26 moves to the right as shown in Fig. 1 so that the shouldered portion 47 of bolt 28 is moved out of engagement with the pivoted arm 45. The release of arm 45 permits switch arm 126 to return to its normal position whereby a circuit is completed from battery 110 through switch 120, conductor 128, the winding of electric bell 109, contact 94, conducting portion 91, contact 93, conductors 123, 129, contact 125, switch arm 126 and through conductor 127 to battery 110. This circuit operates bell 109 to indicate audibly that the pressure in chamber 22 is below the predetermined level.

The return of switch arm 126 to its normal position also energizes winding 100 of solenoid 99 to move armature 98 to the left as viewed in Fig. 1. This movement of armature 98 moves valve gate 95 to open valve 77 so that air under pressure from tank 76 flows through valve 77, orifice 72 (Fig. 4), bore 70, orifice 74, and thence through opening 75 to the interior of the vessel under test. The vessel is then quickly closed and the compressed air from tank 76 increases the pressure of the air confined within the vessel under test.

If no leaks are present, the increase in the pressure in the interior of the vessel under test also increases the pressure within chamber 22 through valve section 54 whereby diaphragm 26 is moved to the left in Fig. 1. This movement of diaphragm 26 moves shouldered portion 47 into engagement with pivoted arm 45 so that switch arm 126 is moved out of engagement with contact 125 and into engagement with contact 124. This movement of switch arm 126 breaks the circuit energizing the bell 109 so that the cessation of the ringing indicates that the predetermined test pressure has been reached. This movement of switch arm 126 also completes the circuit through contact 124 and contacts 103 and 104 to energize winding 101 of solenoid 99 so that valve gate 95 is once again interposed between the tank 76 and the interior of the vessel under test. If the vessel under test remains pressure tight, the tank 76 remains out of communication with the interior of the vessel and the audible alarm 109 remains silent.

However, leaks in the vessel under test produce a decrease in the pressure of the air in both chamber 22 and the interior of the vessel under test so that diaphragm 26 is once again moved to the right in Fig. 1 by the pressure differential to open valve 77 and operate bell 109 as an indication of a leak. The above cycle of operation is repeated until the operator has closed all of the leaks in the vessel and closures.

The operator, upon completion of the test, opens the vessel, closes the valve on tank 76, and removes the testing apparatus which may be conditioned for use in testing another air tight container in the manner described above.

It is to be understood that the apparatus described is merely one embodiment of the invention and that numerous other modifications may be devised by those skilled in the art which will fall within the spirit and scope of the principles of this invention.

What is claimed is:

1. A unitary portable apparatus adapted to be placed within a closed vessel for determining leaks therein comprising means for maintaining a fluid within the vessel at a predetermined pressure other than atmospheric, means positioned entirely within the vessel for detecting a differential between the atmospheric pressure and the pressure within the vessel, and means within the closed vessel and controlled by the detecting means for indicating a pressure differential between the atmosphere and the fluid within the vessel which is less than a predetermined value as a determination of the presence of leaks in the closed vessel under test.

2. A unitary portable apparatus adapted to be placed entirely within a closed vessel for determining leaks therein comprising a pressure tight receptacle having a standard pressure chamber and an ambient pressure chamber open to the pressure of the fluid in the vessel under test, an extensible diaphragm interconnecting the standard and the ambient pressure chambers, a control means secured to the receptacle and actuated by movement of the extensible diaphragm due to a pressure differential between the standard and the ambient chambers, means secured to the diaphragm for varying the amount of movement needed to actuate the control means, a source of fluid pressure, valve means interconnecting the fluid source with the ambient pressure chamber and the interior of the vessel under test, said valve means being electrically connected to and controlled by said control means, and means operated by said control means upon movement of said diaphragm for indicating a leak in said vessel.

3. A portable apparatus adapted to be placed entirely within closed vessels for determining tightness thereof comprising a receptacle having a first and a second chamber therein, said first chamber being filled with a fluid medium under a predetermined pressure and said second chamber open to pressure of the vessel under test, pressure responsive means interposed between the first and the second chambers and movable in response to a pressure differential therebetween, a source of fluid medium under pressure, valve means interconnecting the second chamber and the source of fluid medium with the vessel under test, means actuated by a movement of the pressure responsive means to control the opening and closing of the valve means, and means controlled by said actuated means for indicating a leak in said vessel.

4. A portable apparatus adapted to be positioned within closed vessels for ascertaining leaks therein comprising a pressure tight receptacle having a standard pressure chamber and an ambient pressure chamber open to the pressure of the fluid in the vessel under test, a pressure sensitive means interconnecting the standard and the ambient chambers, a source of fluid medium under pressure, valve means responsive to movement of the pressure sensitive means for controlling the flow of fluid medium to the ambient pressure chamber and the interior of the closed vessel under test, and means responsive to movement of said pressure sensitive means for indicating a leak in said vessel.

5. An apparatus for testing closed vessels for leaks comprising a pressure tight receptacle having a first and a second chamber therein, said first chamber being filled with a fluid medium under a predetermined pressure, a pressure sensitive means in communication with the first and the second chambers and responsive to a fluid pressure differential therebetween, a source of fluid medium under pressure, a first valve means connected to the fluid medium source, a second valve means interconnecting the first valve means and the second chamber with the interior of the vessel under test, and means controlled by the movement of the pressure responsive means to close the first valve means when the pressure differential between the first and the second chambers exceeds a predetermined value.

6. A portable apparatus adapted to be placed within a sealed vessel to be tested for leaks comprising a receptacle having two chambers therein, a flexible diaphragm interconnecting the two chambers and movable in response to a pressure differential therebetween, electrical switching means operated by a predetermined movement of the diaphragm, audible alarm means controlled by said switching means, a source of fluid under pressure secured to the receptacle, and control means for interconnecting the source of fluid under pressure and one of the chambers with the fluid surrounding the receptacle and simultaneously therewith interconnecting the electrical switching means with the audible alarm.

7. In a portable apparatus adapted to be placed entirely within a sealed vessel to be tested, a first chamber filled with air under a predetermined pressure, a second chamber open to the ambient pressure of the air in the vessel under test, an extensible pressure sensitive diaphragm interconnected between the said chambers and workable in response to a pressure differential between the two chambers, a source of air under pressure, an electrically operated valve for emitting air under pressure from the said source into the sealed vessel to maintain the air pressure therein to a predetermined level, and electrically controlled signalling means actuated by the said diaphragm to indicate a decrease in pressure within the vessel when a leak occurs.

8. In a portable apparatus adapted to be placed inside a closed container to determine leaks therein, a pressure tight receptacle having two chambers, a valve in one of the chambers for equalizing the air pressure within this chamber and the ambient pressure of the atmosphere in the container under test, an extensible diaphragm interconnecting the two chambers, means extending through the second chamber for manually extending the said diaphragm, a switch positioned in the second chamber and actuated by said means when in a predetermined position, an electric and pneumatic control device having valves for controlling the emission of compressed air from the said tank into the container under test, electrical means for controlling the said valves, said control device also having an electrical selector switch, means for manually setting the control device to test the container which is then sealed after such setting, and electrical signalling means connected to the said electrical means and the said selector switch and actuated by the said switch positioned in the second chamber upon movement of the diaphragm to indicate when the container under test is defective.

9. In a portable apparatus adapted to be placed entirely within a sealed vessel to be tested, a chamber filled with air under a predetermined pressure, an extensible, pressure-sensitive diaphragm secured in the chamber and operable in response to a pressure differential between the fluid in the chamber and the ambient fluid in the closed vessel, a source of fluid under pressure, an electrically operated valve for emitting fluid under pressure from said source into the sealed vessel to maintain the fluid pressure therein to a predetermined pressure which is different than that of the surrounding atmosphere, and an electrically controlled signalling means actuated by operating the said diaphragm to indicate a decrease in pressure within the vessel when a leak occurs.

References Cited in the file of this patent

UNITED STATES PATENTS

| | | |
|---|---|---|
| 1,461,700 | Nichols | July 10, 1923 |
| 1,900,918 | Dieter | Mar. 14, 1933 |
| 1,933,322 | Fagan | Oct. 31, 1933 |
| 2,082,325 | Cross | June 1, 1937 |
| 2,230,961 | Lewis | Feb. 4, 1941 |
| 2,387,743 | Cameron | Oct. 30, 1945 |
| 2,520,624 | Davey | Aug. 29, 1950 |

FOREIGN PATENTS

| | | |
|---|---|---|
| 978,221 | France | Nov. 22, 1950 |